(12) United States Patent  (10) Patent No.: US 9,257,121 B2
Ma et al.  (45) Date of Patent: Feb. 9, 2016

(54) DEVICE AND METHOD FOR PASS-PHRASE MODELING FOR SPEAKER VERIFICATION, AND VERIFICATION SYSTEM

(75) Inventors: Long Ma, Beijing (CN); Haifeng Shen, Beijing (CN); Bingqi Zhang, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 315 days.

(21) Appl. No.: 13/989,577

(22) PCT Filed: Dec. 10, 2010

(86) PCT No.: PCT/CN2010/079654
§ 371 (c)(1),
(2), (4) Date: May 24, 2013

(87) PCT Pub. No.: WO2012/075641
PCT Pub. Date: Jun. 14, 2012

(65) Prior Publication Data
US 2013/0238334 A1 Sep. 12, 2013

(51) Int. Cl.
G10L 17/04 (2013.01)
G10L 21/00 (2013.01)
G10L 15/00 (2013.01)
G10L 17/16 (2013.01)

(52) U.S. Cl.
CPC .................. *G10L 17/04* (2013.01); *G10L 17/16* (2013.01)

(58) Field of Classification Search
CPC ......... G10L 17/04; G10L 17/24; G10L 17/00; G06F 21/32; G06Q 20/341; G06Q 20/346
USPC ......................................... 704/244, 273, 233
See application file for complete search history.

(56) References Cited

U.S. PATENT DOCUMENTS 8,099,288 B2   1/2012  Zhang et al.
2004/0186724 A1*  9/2004  Morin ........................... 704/273
(Continued)

FOREIGN PATENT DOCUMENTS

CN   101814159      8/2010
CN   101833951 A    9/2010
(Continued)

OTHER PUBLICATIONS

International Search Report mailed Sep. 22, 2011 in corresponding International Application No. PCT/CN2010/079654.
(Continued)

*Primary Examiner* — Charlotte M Baker
(74) *Attorney, Agent, or Firm* — Wenderoth, Lind & Ponack, L.L.P.

(57) ABSTRACT

A device and method for pass-phrase modeling for speaker verification and a speaker verification system are provided. The device comprises a front end which receives enrollment speech from a target speaker, and a template generation unit which generates a pass-phrase template with a general speaker model based on the enrollment speech. With the device, method and system of the present disclosure, by taking the rich variations contained in a general speaker model into account, the robust pass-phrase modeling is ensured even the enrollment data is insufficient, even just one pass-phrase is available from a target speaker.

28 Claims, 5 Drawing Sheets

(56) References Cited

U.S. PATENT DOCUMENTS

2008/0195389 A1     8/2008    Zhang et al.
2011/0202340 A1*   8/2011    Ariyaeeinia et al. .......... 704/233

FOREIGN PATENT DOCUMENTS

JP      2008-146054     6/2008
WO    2008/100971     8/2008

OTHER PUBLICATIONS

S. Kwon et al.; "Unsupervised Speaker Indexing Using Generic Models"; IEEE Transactions on Speech and Audio Processing; Sep. 2005, vol. 13, No. 5; pp. 1007-1008.

Da Peng Liu; "Research on Speaker Recognition in Conversational Speech"; Chinese Master's Theses Full-text Database; May 2007; No. 5; pp. 13, 18-25, 38-39, 44, 51-56 (with English abstract).

S. Kwon, et al.; "Unsupervised Speaker Indexing Using Generic Models"; IEEE Transactions on Speech and Audio Processing; Sep. 2005, vol. 13, No. 5, pp. 1004-1013.

Seiichi Nakagawa, et al.; "Speaker Identification by Combining Speaker Specific GMM with Speaker Adapted Syllable-based IIMM"; May 2003, vol. 103, No. 94, p. 31-36 (with English Abstract).

Chinese Search Report issued Apr. 17, 2014 in a corresponding Chinese Application (in English).

Zhang et al., "The Research of Speaker Verification Based on GMM-UBM", vol. 1, No. 4, (2007), pp. 420-425 (with English Abstract).

\* cited by examiner

DEVICE AND METHOD FOR PASS-PHRASE MODELING FOR SPEAKER VERIFICATION, AND VERIFICATION SYSTEM

TECHNICAL FIELD

The present disclosure is related to speech (audio) processing technology, and particularly related to the technology of speaker recognition and speaker verification.

BACKGROUND

Speaker recognition technology is useful in Human-Machine Interaction. Many applications and products could be enabled or augmented with speaker recognition technology, such as (1) on-site access control to some facilities (home appliances, car, PC terminals etc., or (2) remote secured access to database, website, even bank transaction through the lines of telephone, mobile or computer.

An enrollment or registration process for a target speaker is necessary before utilizing speaker recognition technology in a real system. In the speaker enrollment process, a sample speech from a target speaker is collected and used to generate the statistic template of a specific speaker. The quality of generated statistic template has big influence on the performance of the speaker recognition system.

FIG. 1 shows a diagram of a conventional device for pass-phrase modeling for speaker verification system. When a user wants to register his or her pass-phrase during the enrollment process, the utterances of the pass-phrase from the target user is requested by a front end 101 of the speaker verification system. Since the user's utterances are not always exactly the same each time, 3-5 repetitions of the pass-phrase are necessary in order to get a robust statistic template model in a modeling unit 103. The created template model is stored into a database 105 for the later verification. Two main disadvantages of the conventional method are: (1) if less enrollment data available or big intra-speaker variations existing, the effect of enrollment is not assured; and (2) user experience is not so good if more repetitions are needed since the users prefer a simple enrollment procedure.

SUMMARY OF THE DISCLOSURE

In one aspect of the present disclosure, a pass-phrase modeling device for speaker verification is provided, which comprises: a front end which receives enrollment speech from a target speaker; and a template generation unit which generates a pass-phrase template with a general speaker model based on the enrollment speech.

In another aspect of the present disclosure, a pass-phrase modeling method for speaker verification is provided, which comprises steps of: receiving enrollment speech from a target speaker, and generating a pass-phrase template with a general speaker model based on the enrollment speech.

In a further aspect of the present disclosure, a speaker verification system is provided, which comprises: a front end which receives enrollment speech and/or testing speech from a target speaker; a template generation unit which generates a pass-phrase template with a general speaker model based on the enrollment speech; and a dynamic matching unit which compares the testing speech from the target speaker with data selected from the pass-phrase template, wherein if the result of comparison is equal to or more than a threshold, the target speaker is accepted as the claimed speaker.

With the device, method, and system of the present disclosure, by taking the rich variations contained in a general speaker model into account, the robust pass-phrase modeling is ensured when the enrollment data is insufficient, and even just one pass-phrase is available from a target speaker.

The foregoing is a summary and thus contains, by necessity, simplifications, generalization, and omissions of details; consequently, those skilled in the art will appreciate that the summary is illustrative only and is not intended to be in any way limiting. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
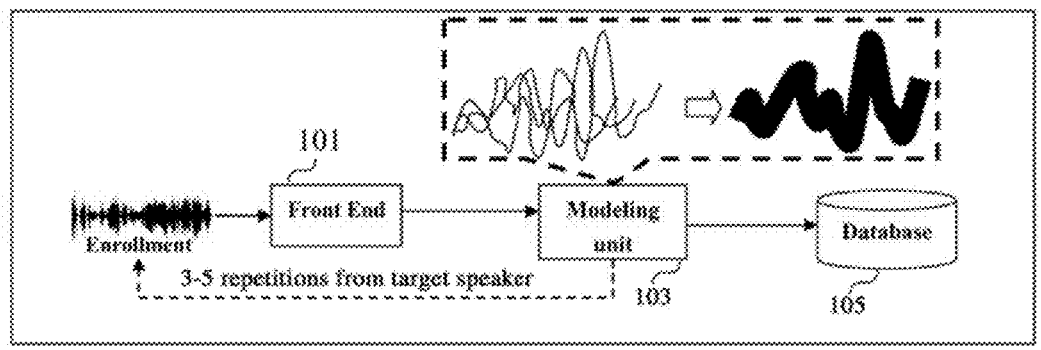
FIG. 1 shows a diagram of a conventional device for pass-phrase modeling for speaker verification.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The disclosure is drawn, inter alia, to devices, methods, and systems related to pass-phrase modeling for speaker verification.

Figure 2:
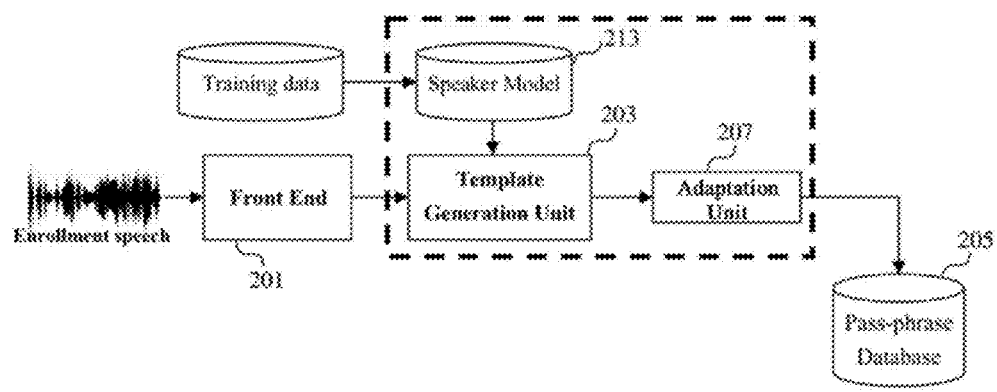
FIG. 2 shows a diagram of a device for pass-phrase modeling for speaker verification according to one embodiment of the present disclosure.

FIG. 2 shows a diagram of a device for pass-phrase modeling for speaker verification according to one embodiment of the present disclosure.

As shown in FIG. 2, the device 200 for pass-phrase modeling for speaker verification according to one embodiment of the present disclosure comprises: a front end 201, template generation unit 203, adaptation unit 207, pass-phrase database 205, and speaker model database 213. In the above structure, the template generation unit 203 is connected to the front end 201, adaptation unit 207, pass-phrase database 205, and speaker model database 213, respectively. According to one embodiment of the disclosure, the device 200 may comprise only the template generation unit 203 which is connected to other units such as the front end 201, adaptation unit 207, pass-phrase database 205, and speaker model database 213 as external units or devices.

The device 200 for pass-phrase modeling for speaker verification according to one embodiment comprises a front end 201 which receives enrollment speech from a target speaker, and a template generation unit 203 which generates a pass-phrase template with a general speaker model based on the enrollment speech.

Hereinafter, the description will be given to the operations of the above respective units of the device 200 according to one embodiment of the present disclosure.

Specifically, the device 200 needs to train a general speaker model (HMM (Hidden Markov Model) or GMM-UBM (Universal Background Model)), which is essentially a mixture model with M (for example M=1024) Gaussian components. Such Gaussian components are extracted from a collection of speech data from a large number of speakers representative of the population of the speakers expected during the speaker verification. The general speaker model is supposed to include rich variations caused by inter-speaker and intra-speaker differences, which is for example represented as follow:

$$[w_j, \theta_j(\mu_j, \Sigma_j)] \quad 1 \le j \le M \quad (1)$$

$$w_j > 0 \text{ and } \sum_{j=1}^{M} w_j = 1$$

Herein $w_j$, $\mu_j$ and $\Sigma_j$ are the weight, mean and covariance of the $j^{-th}$ mixture component of UBM respectively.

That is, the general speaker model is composed of a plurality of Gaussian components representing speech data collected from a large number of speakers expected during the speaker verification. The trained general speaker model is stored into the speaker model database 213 in advance.

Figure 3:
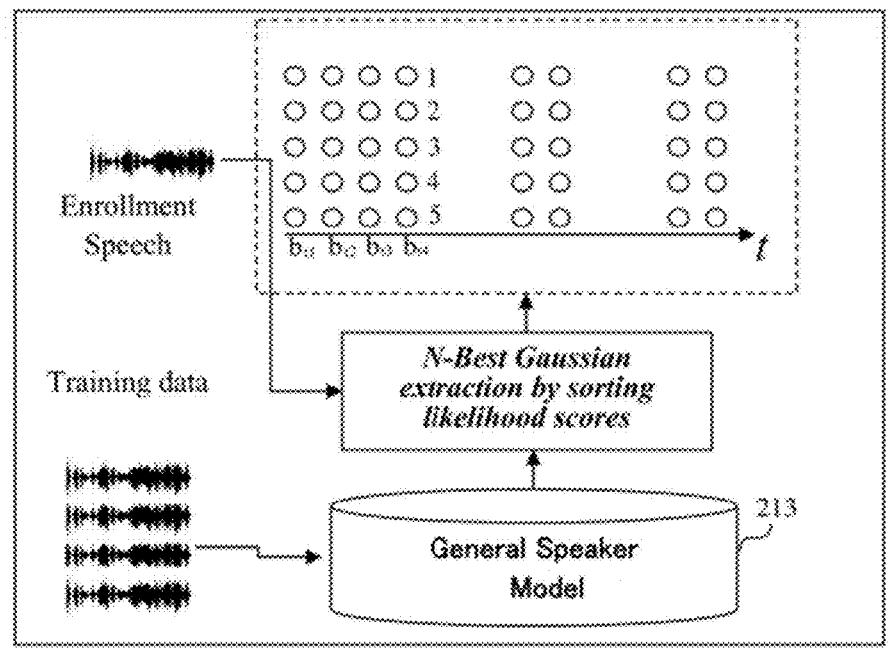
FIG. 3 shows a schematic diagram of the top-N Gaussian components (distributions) selected from the general speaker model for each frame of the enrollment speech.

FIG. 3 shows a schematic diagram of the top-N Gaussian components selected from the general speaker model for each frame of the enrollment speech.

According to one embodiment of the present disclosure, the front end 201 receives enrollment speech from a target speaker, and divides the enrollment speech into a plurality of frames, and extracts feature parameters representing the acoustic characteristics and/or the contents from each of the plurality of frames.

Specifically, in the front end 201, the enrollment speech from the target speaker is divided into respective frames, each of which is for example 10 ms, and each frame is extracted with feature parameters such as LPCC (Linear Prediction Cepstrum Coefficients) or MFCC (Mel-scale Frequency Cepstrum Coefficients). The detailed process of parameter extraction according to one embodiment of the present disclosure is described but not limited to as follows. In the Front end 201, for example, MFCC parameters are extracted frame by frame. With respect to each frame of the enrollment speech, a pre-emphasis processing is performed with the coefficient such as 0.97, the sampling frequency of speech data is given as 16 kHz, a power spectrum is calculated every 10 ms by a 512-points FFT with a 20 ms hamming window. DOT (Discrete Cosine Transform) transformation is used to convert the log energies of 24 Mel-scaled triangular filter-banks into 12 orders of cepstrum. In addition, the log energy of each frame is also computed and combined with the cepstrum to form a 13-dimension vector. The first and second order derivatives of original static feature vector are then computed Feature normalization including cepstral mean subtraction (CMS) and variance normalization is used to reduce the mis-match between signals recorded in different conditions. Thereby, the feature parameters such as MFCC parameters of each frame of the enrollment speech of the target speaker are obtained. The parameter extraction according to the present disclosure is not limited to the above process, and the feature parameters may be obtained by means of other known processes.

According to one embodiment of the present disclosure, the template generation unit 203 computes the likelihood scores of each of the Gaussian components of the general speaker model with the feature parameters of each frame, and selects N Gaussian components with the highest likelihood scores for each frame. Here, N is a natural number.

Specifically, the template generation unit 203 receives the feature parameters of each frame from the front end 201, and computes the likelihood scores of the Gaussian components of the general speaker model received from the speaker model database 213 based on the feature parameters, to extract the top-N Gaussian component list for each frame of the enrollment speech. Herein, N could be a natural number and decided by some kind of distance measurement.

In the template generation unit 203, with the MFCC parameters of each frame applied to each of Gaussian components of the general speaker model, Top-N Gaussian Component list of each frame could be obtained with following formula:

$$\phi_j(X_t, \theta_j) = w_j \cdot \frac{1}{(2\pi)^{d/2}|\Sigma_j|^{1/2}} \exp\left\{-\frac{1}{2}(X_t - \mu_j)^t \Sigma_j^{-1}(X_t - \mu_j)\right\} \quad (2)$$

$$1 \le j \le M$$

$$\phi(X_t, \theta) = \sum_{j=1}^{M} \phi_j(X_t, \theta_j) \quad (3)$$

Herein, the parameter $X_t$ are a feature parameter such as MFCC parameter extracted at the time t, the parameters $w_j$, $\mu_j$ and $\Sigma_j$ are the weight, mean and covariance of j-th mixture component of the general speaker model respectively, $\phi_j(X_t, \theta_j)$ is the likelihood score of a component j, and $\phi(X_t, \theta)$ is the total likelihood score of the general speaker model at each frame (t).

The likelihood scores of Gaussian components of each frame could be sorted, and the top-N Gaussian components with the highest likelihood scores of each frame could be selected. The list of top-N Gaussian components at the time t could be represented as:

$$j_{t,s} (1 \le s \le N, 0 \le t \le T).$$

Here, N could be a predefined value or set according to the posterior probability ($p_{t,s}$ in the following formula (4)) of Gaussian components to include the Gaussian components with the highest posterior probabilities. Herein, the higher the likelihood score of a Gaussian component of a frame is, the closer the Gaussian component is to the acoustic characteristics and/or the contents of the frame of the enrollment speech.

As shown in the FIG. 3, the reference numerals $b_{t1}$, $b_{t2}$, $b_{t3}$, $b_{t4}$, ... represent each frame of the enrollment speech respectively, and the reference numerals 1, 2, 3, 4, 5, represent the extracted 5 Gaussian components of each frame. Herein, N is five. All dots located on junctions of reference numerals $b_{t1}$, $b_{t2}$, $b_{t3}$, $t_4$ ... and reference numerals 1, 2, 3, 4, 5 form the list of the top-N Gaussian components selected from the general speaker model.

Figure 4:
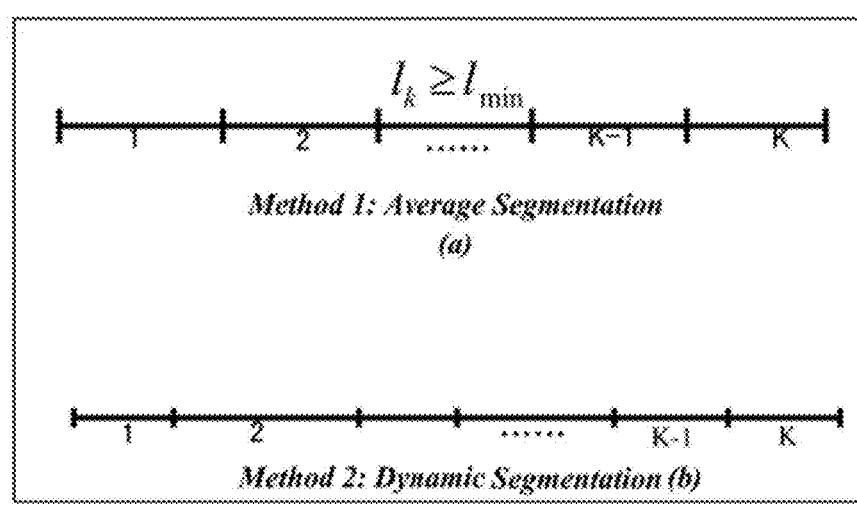
FIG. 4 shows a diagram of dividing the enrollment speech into plural segments.

FIG. 4 shows a diagram of dividing the enrollment speech into plural segments. According to one embodiment of the present disclosure, the template generation unit 203 cuts the enrollment speech into multiple segments with equal or unequal sizes, each segment includes plural frames.

Specifically, in the template generation unit 203, the enrollment speech is cut into segments along time axis, each of segments includes several (multiple) frames. As shown in the FIG. 4, two options are possible. Option 1 is to evenly cut the enrollment speech into K segments, and the duration (period) of each segment should be above a fixed threshold, i.e., $L_k \geq L_{min}$, as shown in the FIG. 4(a). For option 2, the number and boundaries of the segments will be determined by the dynamic top-N Gaussian component list, as shown in the FIG. 4(b).

The detailed algorithm used in the dynamic segmentation is described but not limited to as follows:

(1) To compute posterior probabilities of each Gaussian component within the top-N list at time t with the following formula (4), $$p_{t,s} = \frac{\phi_{t,s}(X_t, \theta_{t,s})}{\phi(X_t, \theta)} \quad 1 \leq s \leq N \quad (4)$$

(2) To find Gaussian component pairs with equal component index between two adjacent frames at the times t−1 and t. And then compute the similarity between adjacent two frames based on the posterior probabilities of the top-N Gaussian components:

$$sim(t-1, t) = \sum_{t,t'} p_{t-1,j} \cdot p_{t,j'}, \, j_{t-1,j} = j_{t,j'}, \, 1 \leq i, i' \leq N \quad (5)$$

As an alternative, the similarity distance could be computed based on the product of the ranks of Gaussian component pairs as formula (6):

$$sim(t-1, t) = \sum_{i,i'} i \cdot i', \, j_{t-1,i} = j_{t,i'}, \, 1 \leq i, i' \leq N \quad (6)$$

(3) Cut the enrollment speech into segments by comparing the distances between adjacent frames with predefined threshold.

Here in formulas (5) and (6), $j_{t,i}$ is the i-th Gaussian component in the list of top-N Gaussian components selected and sorted at the time t. The boundary of the segments could be represented as $b_k$, $1 \leq k \leq K$. As a result, the enrollment speech could be segmented into K segments according to above similarity definition formulas (5) or (6).

According to one embodiment of the present disclosure, the template generation unit 203 sorts and merges the extracted Gaussian components of all frames within each segment to obtain a Hidden Markov Model net, as the passphrase template. The above sorting and merging means that the template generation unit 203 sorts the Gaussian components of all frames within each segment with different component index, accumulates their posterior probabilities, finds and merges the closest Gaussian components in a distance measurement of the posterior probabilities.

Specifically, in the template generation unit 203, for each segment, Gaussian components existing in the top-N Gaussian component list can either be merged into one GMM or clustered into K classes and merged into K GMMs. A part of Gaussian components could be removed before merging and clustering according to some rules, such as component occurrence frequency, component rank in top-N, the sum of posterior probabilities of each component, etc.

Figure 5:
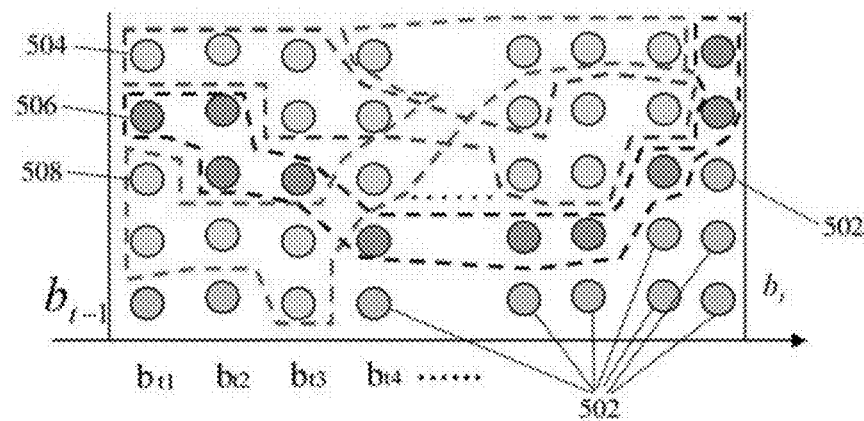
FIG. 5 shows a diagram of Gaussian components in one segment of the enrollment speech merged into one or several GMMs (Gaussian Mixture Model)

FIG. 5 shows a diagram of Gaussian components in one segment of the enrollment speech merged into one or several GMMs.

The process of mergence of the Gaussian components in the top-N Gaussian component list of the corresponding segment will be described as follows. As shown in the FIG. 5, the period from $b_{t-1}$ to $b_t$ represents a segment of the enrollment speech, which includes plural frames denoted by $b_{t1}$, $b_{t2}$, $b_{t3}$, $b_{t4}$, .... In the segment as shown in the FIG. 5, the Gaussian components with different component index are elected, and their corresponding posterior probabilities are accumulated together by the following formula:

$$sump(I_q) = \sum_{b_{t-1} < t \leq b_t}^{j_{s,s}=I_q} p_{t,s} \quad (7)$$

Here $I_{ij}$ is the index of Gaussian component. The goal of (7) is to sum over the posterior probabilities of $I_{ij}$ appeared in the top-N Gaussian component list within each segment. Some Gaussian components such as nodes 502 with lower accumulated posterior probabilities than a predefined threshold are removed.

The selected Gaussian components are iteratively clustered into K GMMs by using model based clustering methods, such as K-means or agglomerative clustering. According to one embodiment of the present disclosure, the process of mergence may be executed as follow:

(a) Initialize each Gaussian cluster with each Gaussian component selected from the above step, set cluster number as C;

(b) And the closest components in sense of some distance measurement, such as Bahalanobis distance as formula (8):

$$d(i, j) = \frac{1}{2} \cdot [(\mu_i - \mu_j)^T \Sigma_i^{-1} (\mu_i - \mu_j) + (\mu_j - \mu_i)^T \Sigma_j^{-1} (\mu_j - \mu_i)] \quad (8)$$

Alternatively, Bhattacharyya distance and KL-divergence could also be used;

(c) Merge two closest Gaussians $[w_1,\theta_1(\mu_1,\Sigma_1)],[w_2\theta_2(\mu_2,\Sigma_2)]$ (with formula (9):

$$w = w_1 + w_2 \quad (9)$$
$$\mu = \frac{N_1}{N_1+N_2}\cdot\mu_1 + \frac{N_2}{N_1+N_2}\cdot\mu_2$$
$$\Sigma = \frac{N_1}{N_1+N_2}\cdot\Sigma_1 + \frac{N_2}{N_1+N_2}\cdot\Sigma_2 + N_1\cdot N_2\cdot(\mu_1-\mu_2)\cdot(\mu_1-\mu_2)^T$$
$$N_1 = w_1\cdot p_1,$$
$$N_2 = w_2\cdot p_2$$
$$\text{where } p_1 = sump_1,$$
$$p_2 = sump_2$$

P1 and P2 can also be simply set as 1.0. In the formulas (8) and (9), $w_j$, $\mu_j$ and $\Sigma_j$ are the weight, mean and covariance of j-th mixture component of the general speaker model, respectively.

(d) C=C−1, if C<=K, then stop; else goto (b).

As shown in the FIG. 5, the Gaussian components represented by reference numeral 504 are merged into one GMM, the Gaussian components represented by reference numeral 505 are merged into one GMM, and the Gaussian components represented by reference numeral 506 are merged into one GMM. For example, three GMMs are finally obtained in the segment from $b_{t-1}$ to $b_t$. The Gaussian components represented by reference numeral 502 are removed since they have relative low accumulated posterior probabilities than a defined threshold.

The above process is repeated for all segments of the enrollment speech, and the Gaussian components existing in all top-N Gaussian component lists are used in the template generation unit 203 to build a HMM net. Each node of the HMM net is the clustered GMM generated by the Gaussian components extracted from the general speaker model.

Figure 6:
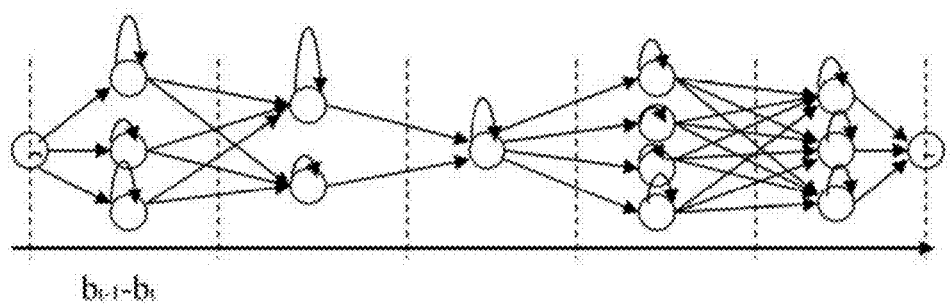
FIG. 6 shows a diagram of a HMM net composed of the merged GMMs.

FIG. 6 shows a diagram of a HMM net composed of the merged GMMs.

After the merging process, the merged GMMs could be concatenated together and a HMM net is formed. As shown in the FIG. 6. The state of the HMM net is composed of GMMs obtained by the above Gaussian merging process. The GMMs obtained from the same segment (the period such as from $b_{t-1}$ to $b_t$) are in parallel states in the HMM net, and the GMMs between consecutive segments are fully linked. The initial transfer probabilities between each state pair could be assigned as 1/L, where L is the total number of the fan-out arcs of the current state in the HMM net.

Thereby, the HMM net is created for speaker verification according to one embodiment, and it is stored into the pass-phrase database 205 as the pass-phrase template for target speakers. Each of the GMMs may well represent the acoustic characteristics and/or the contents of the enrollment speech of the target speakers.

According to another embodiment of the present disclosure, the HMM net is adapted in accordance with the enrollment speech by adaptation methods such as MAP and MLLR, and the adapted HMM network is stored into the database 205 as the pass-phrase template.

In the adaptation unit 207, Baum-Welch algorithm may be used to do MLLR (Maximum Linear Likelihood Regression)/MAP (Maximum A Posteriori) based adaptation over the HMM net with the speaker's enrollment speech to create the speaker dependent pass-phrase pattern, and the adapted HMM net is stored into the pass-phrase database 205 as the template of pass-phrase for target speaker instead of the HMM net without adaptation. Since the adaptation technology is common means, the details thereof will not be described hereinafter.

Figure 7:
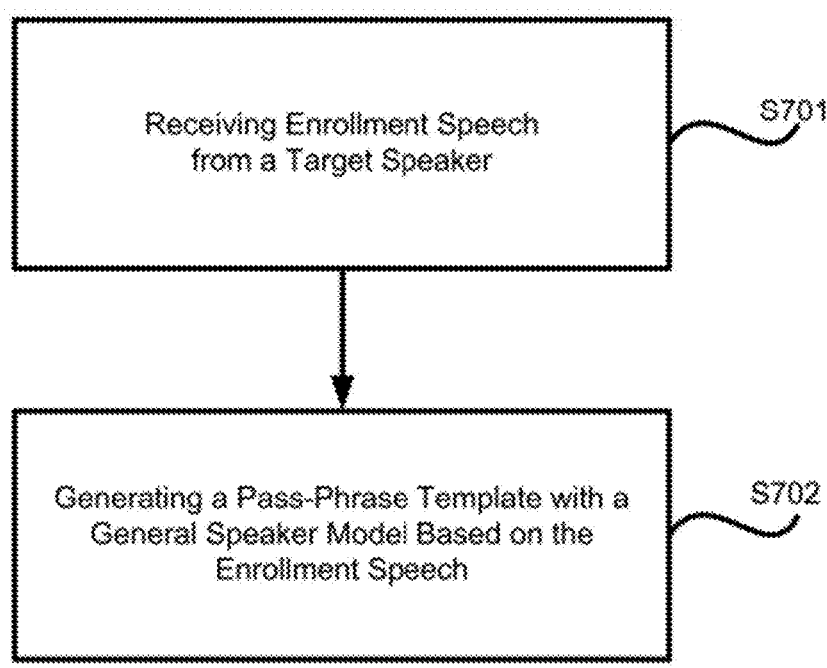
FIG. 7 illustrates a flow chart of a method of pass-phrase modeling for speaker verification.

FIG. 7 illustrates a flow chart of a method of pass-phrase modeling for speaker verification according to one embodiment of the present disclosure.

As shown in the FIG. 7, the pass-phrase modeling method for speaker verification according to one embodiment of the present disclosure comprises the following steps. In step S701, an enrollment speech is received from a target speaker. In step S702, a pass-phrase template is generated with a general speaker model based on the enrollment speech.

According to one embodiment of the present disclosure, the above step S701 can be executed by the front end 201, and the above step S702 can be executed by the template generation unit 203.

According to another embodiment of the present disclosure, the pass-phrase modeling method further comprises steps of: dividing the enrollment speech into a plurality of frames; and extracting feature parameters representing the acoustic characteristics and/or the contents from each of the plurality of frames. The above step can be executed by the front end 201. In the present disclosure, the general speaker model is composed of a plurality of Gaussian components representing speech data collected from a large number of speakers expected during the speaker verification.

According to another embodiment of the present disclosure, the pass-phrase modeling method further comprises steps of: computing the likelihood scores of each of the Gaussian components with the feature parameters of each frame; and selecting N Gaussian components with the highest likelihood scores for each frame, the N is a natural number. The above steps can be executed by the template generation unit 203.

According to another embodiment of the present disclosure, the pass-phrase modeling method further comprises steps of: cutting the enrollment speech into multiple segments with equal or unequal sizes, wherein each segment includes plural frames. The above step can be executed by the front end 201 or the template generation unit 203.

According to another embodiment of the present disclosure, the pass-phrase modeling method further comprises steps of: sorting the Gaussian components of all frames within each segment; and merging the sorted Gaussian components to obtain a Hidden Markov Model net as the pass-phrase template. The above steps can be executed by the template generation unit 203.

According to another embodiment of the present disclosure, the pass-phrase modeling method further comprises steps of: sorting the Gaussian components of all frames within each segment with different component index; accumulating the posterior probabilities of the sorted Gaussian components; and merging the closest Gaussian components in a distance measurement of the posterior probabilities. The above steps can be executed by the template generation unit 203.

According to another embodiment of the present disclosure, the pass-phrase modeling method further comprises steps of: adapting the pass-phrase template in accordance with the enrollment speech by adaptation methods such as MAP and MLLR. The above step can be executed by the adaptation unit 207.

The execution of the above steps of the method is not limited to the above sequence, and the steps can be executed in any sequence and/or in a parallel manner. It is also possible that not all of the steps as shown are necessary to be executed.

Figure 8:
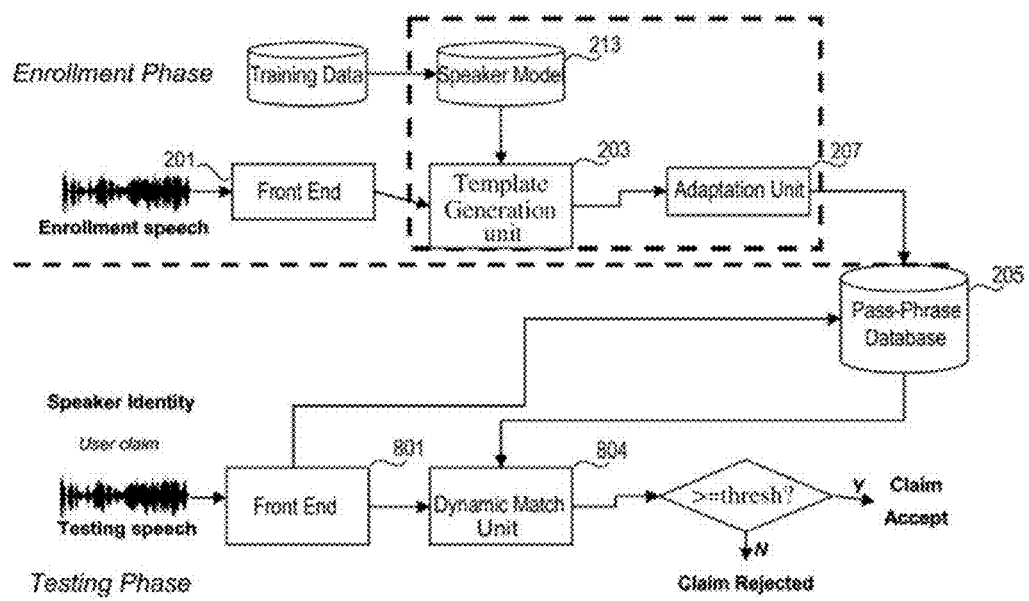
FIG. 8 shows a diagram of a speaker verification system according to one embodiment of the present disclosure.

FIG. 8 shows a diagram of a speaker verification system according to one embodiment of the present disclosure.

The whole speaker verification system is composed of two phases, one of which is an enrollment phase, and another one is a testing phase. The structure of the enrollment phase is the same as described with reference to the FIG. 2, so the details thereof are omitted hereinafter. The testing phase includes a front end 801 and a dynamic match unit 804. The front end 801 receives a testing speech from the target speaker, converts the testing speech into feature parameters, and sends the feature parameters to the dynamic match unit 804. The front end 801 and the front end 201 can be realized by only one unit, which is not limited to the above construction. The dynamic match unit 804 receives the feature parameters from the front end 801, and computes the likelihood score of the testing speech of the target speaker by applying the feature parameters onto data (GMM) selected from the HMM net stored in the pass-phrase database 205. Then, the dynamic match unit 804 compares the computed likelihood score with a pre-defined threshold. If the computed likelihood score is equal to or more than the predefined threshold, the target speaker providing the testing speech is accepted as the claimed speaker. If the computed likelihood score is less than the predefined threshold, the testing speech is refused, and the target speaker is not considered as the claimed speaker.

Thereby, the speaker verification system according to one embodiment of the present disclosure comprises: a front end 201 and/or 801 which receives enrollment speech and/or testing speech from a target speaker; a template generation unit 203 which generates a pass-phrase template with a general speaker model based on the enrollment speech; and a dynamic match unit 804 which compares the testing speech from the target speaker with the data selected from the pass-phrase template, wherein if the result of comparison is equal to or more than a threshold, the target speaker is accepted as the claimed speaker.

According to another embodiment of the present disclosure, in the speaker verification system, the front end 801 further receives speaker identity from the target speaker, and the dynamic match unit 804 selects the pass-phrase template for comparison from the pass-phrase database 205 based on the speaker identity.

Specifically, before the dynamic match unit 804 compares the testing speech with data selected from the pass-phase database 205, the front end 801 may receive the speaker identity information from the speaker. On the other hand, predefined speaker identity information may be stored into the pass-phrase database 205 in advance. The front end 801 loads the corresponding speaker identity information from the pass-phrase database 205, and compares it with the speaker identity information received from the front end 801. If the speaker identity information loaded from the pass-phrase template database 205 is in accord with the speaker identity information received from the front end 801, the dynamic match unit 804 will select the data for the matching operation of the testing speech from the pass-phrase database 205 based on the speaker identity information, and perform the matching operation as described above. If the speaker identity information loaded from the pass-phrase database 205 is not accord with the speaker identity information received from the front end 801, the dynamic match unit 804 will not perform the matching operation of the testing speech.

That is to say, during the testing phase, the testing speech with a claimed identity will be verified by the dynamic match unit 804 between the testing speech from the speaker with the claimed identity and the pass-phrase template (i.e. a HMM net). A decision whether or not the claimed identity is verified could be made according to the matching score and a pre-defined threshold. Since the testing phase is not focus of the present disclosure, and it is the commonly used means in the art, the detailed description of the same will be omitted.

According to one embodiment of the present disclosure, the front end 201 of the system divides the enrollment speech into a plurality of frames, and extracts feature parameters representing the acoustic characteristics and/or the contents from each of the plurality of frames.

According to one embodiment of the present disclosure, the general speaker model is composed of a plurality of Gaussian components representing speech data collected from a large number of speakers expected during the speaker verification.

According to one embodiment of the present disclosure, the template generation unit 203 of the system computes the likelihood scores of each of the Gaussian components with the feature parameters of each frame, and selects N Gaussian components with the highest likelihood scores for each frame, the N is a natural number.

According to one embodiment of the present disclosure, the front end 201 or the template unit 203 of the system cuts the enrollment speech into multiple segments with equal or unequal sizes, each segment includes plural frames.

According to one embodiment of the present disclosure, the template generation unit 203 of the system sorts the Gaussian components of all frames within each segment, and merges the sorted Gaussian components to obtain a Hidden Markov Model net as the pass-phrase template.

According to one embodiment of the present disclosure, the template generation unit 203 of the system sorts the Gaussian components of all frames within each segment with different component index, accumulates the posterior probabilities of the sorted Gaussian components, and merges the closest Gaussian components in a distance measurement of the posterior probabilities.

According to one embodiment of the present disclosure, the pass-phrase template is adapted in accordance with the enrollment speech by adaptation methods such as MAP and MLLR.

Figure 9:
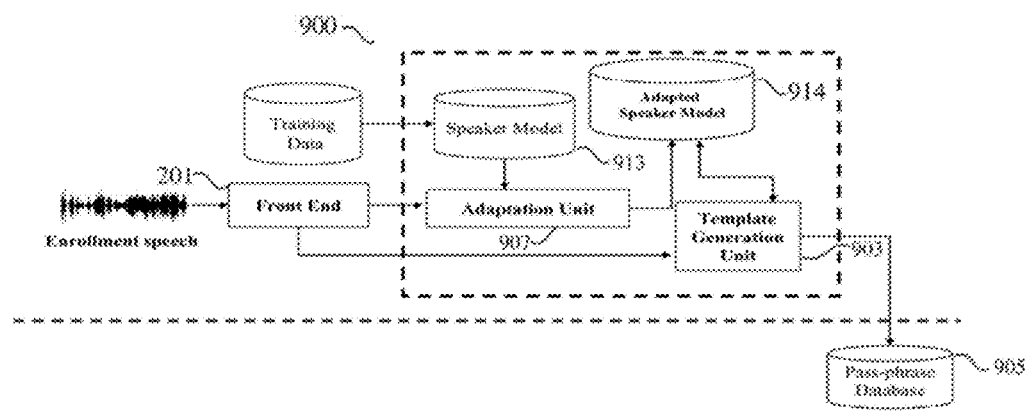
FIG. 9 shows a diagram of a device for pass-phrase modeling for speaker verification according to another embodiment of the present disclosure.

FIG. 9 shows a diagram of a device for pass-phrase modeling for speaker verification according to another embodiment of the present disclosure.

As shown in the FIG. 9, the device 900 for pass-phrase modeling for speaker verification according to another embodiment of the present disclosure comprises a front end 201, template generation unit 903, adaptation unit 907, pass-phrase database 905, speaker model database 913, and adapted speaker model database 914. According to one embodiment of the disclosure, the device 900 may comprise only the template generation unit 903 which is connected to other units such as the front end 201, adaptation unit 907, pass-phrase database 905, and the adapted speaker model database 914 as external units or devices.

As shown in the FIG. 9, a MAP adaptation can be used firstly in the adaptation unit 907 to adapt the general speaker model into the target speaker model in accordance with the enrollment speech by adaptation methods such as MAP and MLLR, and the adapted target speaker model is stored into the adapted speaker model database 914. The HMM net, i.e. the pass-phrase template, could be created based on the adapted target speaker model by the template generation unit 203.

Specifically, the device 900 needs to train a general speaker model (HMM or GMM-UBM) with a collection of speech data from a large number of speakers representative of the population of the speakers expected during the speaker verification. The general speaker model is supposed to include rich variations caused by inter-speaker and intra-speaker differences. The trained general speaker model is stored into the speaker model database 913.

The front end 201 receives the enrollment speech from a target speaker, and converts it into the feature parameters. The adaptation unit 907 receives the feature parameters and applies the feature parameters onto each of the Gaussian components of the general speaker model stored in the speaker model database 913 for the adaptation, and the adapted general speaker model is stored into the adapted speaker model database 914.

The template generation unit 903 receives the feature parameters from the front end 201, and computes the likelihood scores of the Gaussian components of the adapted general speaker model received from the adapted speaker model database 914 based on the feature parameters, to extract the top-N Gaussian component list for each frame of the enrollment speech. The template generation unit 903 uses the Gaussian components existing in the top-N Gaussian component lists to build a HMM net.

The built HMM net is stored into the pass-phrase database 905 as the pass-phrase template for the target speaker.

According to another embodiment, the pass-phrase modeling method of the present disclosure further comprises steps: adapting the general speaker model in accordance with the enrollment speech by adaptation methods such as MAP and MLLR; and generating the pass-phrase template with the adapted general speaker model. The above steps can be executed by the adaptation unit 907 and the template generation unit 903, respectively.

Some preliminary evaluations are done in order to confirm the effects of the present disclosure. The first experiment is to evaluate the effect of the number of enrolment utterances with a traditional text-dependent speaker verification system. Herein, a data set with 10 Japanese young adults' utterance (5 male & 5 female) is adopted, and each speaker provides 10 repetitions for every utterance among 15 patterns, which include digital string, address, person name and email address etc. In the experiment, several utterances from each speaker are used in enrolment phase and built the pass-phrase template. The left utterances from same speaker and all utterances from other speakers will be used in the testing phase. By tuning the number of utterances used in the enrollment phase, the effect of the number of enrolment utterances could be observed as shown in Table-1.

TABLE 1

| Number of enrolment utterance | FAR | FRR |
| --- | --- | --- |
| 1 | 1.29% | 1.33% |
| 2 | 1.06% | 1.00% |
| 3 | 0.79% | 0.78% |

It is shown in Table-1 that along with the number of enrollment utterance increasing, the system performance is also improved. If only one utterance is available during enrollment, the performance will drop about 60% relatively.

The second experiment is to evaluate the effect of the present disclosure. The general speaker model is built with an UBM of 1024 Gaussian components with a large training corpus with more than 400 native Japanese speakers. Each speaker provides about 10 minutes continuous utterance. Only one utterance from target speaker is used in enrolment phase this time and the same utterances in above experiment are used in testing phase. The effects of the adaptation unit 207 and the number of Gaussian components extracted in block 207 are evaluated. The experimental results, i.e. the effects of the present disclosure (adaption & top-N Gaussian extraction) are summarized into following table-2.

TABLE 2

| Configurations | FAR | FRR | Top-N Gaussians |
| --- | --- | --- | --- |
| w/o adaptation | 1.10% | 1.06% | 5 |
| w/adaptation | 1.28% | 1.39% | 1 |
| w/adaptation | 0.89% | 0.82% | 5 |
| w/adaptation | 0.84% | 0.79% | 10 |

The experimental results show with the present disclosure the speaker verification system using only one utterance for enrolment could achieve similar results as traditional speaker verification system with 3 repetitions. And the adaptation unit could bring further improvements.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skills in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations, in addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A pass-phrase modeling device for speaker verification, comprising:
    a front end which receives enrollment speech from a target speaker; and
    a template generation unit which generates a pass-phrase template with a general speaker model based on the speech of the enrollment speech,
    wherein at least one of the pass-phrase template and the general speaker model is adapted in accordance with only the speech of the enrollment speech by adaptation methods.

2. The pass-phrase modeling device according to claim 1, wherein the front end divides the enrollment speech into a plurality of frames, and extracts feature parameters representing acoustic characteristics and/or contents from each of the plurality of frames.

3. The pass-phrase modeling device according to claim 1, wherein the general speaker model is composed of a plurality of Gaussian components representing speech data collected from a large number of speakers expected during the speaker verification.

4. The pass-phrase modeling device according to claim 3, wherein the template generation unit computes the likelihood scores of each of the Gaussian components with the feature parameters of each frame, and selects N Gaussian components with the highest likelihood scores for each frame, N being a natural number.

5. The pass-phrase modeling device according to claim 4, wherein the front end or the template generation unit cuts the enrollment speech into multiple segments with equal or unequal sizes, each segment includes plural frames.

6. The pass-phrase modeling device according to claim 5, wherein the template generation unit sorts the Gaussian components of all frames within each segment, and merges the sorted Gaussian components to obtain a Hidden Markov Model net as the pass-phrase template.

7. The pass-phrase modeling device according to claim 6, wherein the template generation unit sorts the Gaussian components of all frames within each segment with different component index, accumulates posterior probabilities of the sorted Gaussian components, and merges the closest Gaussian components in a distance measurement of the posterior probabilities.

8. The pass-phrase modeling device according to claim 1, wherein the adaptation methods of the adapted pass-phrase template include adaptation methods such as MAP and MLLR.

9. The pass-phrase modeling device according to claim 1, wherein the adaptation methods of the adapted general speaker model include methods such as MAP and MLLR, and the template generation unit generates the pass-phrase template with the adapted general speaker model.

10. A pass-phrase modeling method for speaker verification, the pass-phrase modeling method comprising:
    receiving enrollment speech from a target speaker;
    generating a pass-phrase template with a general speaker model based on the speech of the enrollment speech; and
    adapting at least one of the pass-phrase template and the general speaker model in accordance with only the speech of the enrollment by adaptation methods.

11. The pass-phrase modeling method according to claim 10, further comprising:
    dividing the enrollment speech into a plurality of frames; and
    extracting feature parameters representing acoustic characteristics and/or contents from each of the plurality of frames.

12. The pass-phrase modeling method according to claim 10, wherein the general speaker model is composed of a plurality of Gaussian components representing speech data collected from a large number of speakers expected during the speaker verification.

13. The pass-phrase modeling method according to claim 12, further comprising:
    computing likelihood scores of each of the Gaussian components with the feature parameters of each frame; and
    selecting N Gaussian components with the highest likelihood scores for each frame, the N is a natural number.

14. The pass-phrase modeling method according to claim 13, further comprising:
    cutting the enrollment speech into multiple segments with equal or unequal sizes, wherein each segment includes plural frames.

15. The pass-phrase modeling method according to claim 14, further comprising:
    sorting the Gaussian components of all frames within each segment; and
    merging the sorted Gaussian components to obtain a Hidden Markov Model net as the pass-phrase template.

16. The pass-phrase modeling method according to claim 15, further comprising:
    sorting the Gaussian components of all frames within each segment with a different component index;
    accumulating posterior probabilities of the sorted Gaussian components; and
    merging the closest Gaussian components in a distance measurement of the posterior probabilities.

17. The pass-phrase modeling method according to claim 10, wherein
    the adaptation methods of the adapting the pass-phrase template include methods such as MAP and MLLR.

18. The pass-phrase modeling method according to claim 10, wherein
    the adaptation methods of the adapting the general speaker model include methods such as MAP and MLLR; and said method further comprising:
    generating the pass-phrase template with the adapted general speaker model.

19. A speaker verification system comprising:
    a processor; and
    a non-transitory computer-readable medium having stored therein executable instructions, which when executed by the processor, cause the speaker verification system to function as:
    a front end which receives enrollment speech and/or testing speech from a target speaker;
    a template generation unit which generates a pass-phrase template with a general speaker model based on the speech of the enrollment speech; and
    a dynamic match unit which compares the testing speech from the target speaker with data selected from the pass-phrase template, wherein
    at least one of the pass-phrase template and the general speaker model is adapted in accordance with only the speech of the enrollment speech by adaptation methods, and
    if the result of comparison is equal to or more than a threshold, the target speaker is accepted as a claimed speaker.

20. The speaker verification system according to claim 19, wherein the front end also receives speaker identity information from the target speaker, and the dynamic match unit selects data for comparison from the pass-phrase template based on the speaker identity information.

21. The speaker verification system according to claim 20, wherein the front end divides the enrollment speech into a plurality of frames, and extracts feature parameters representing acoustic characteristics and/or contents from each of the plurality of frames.

22. The speaker verification system according to claim 21, wherein the general speaker model is composed of a plurality of Gaussian components representing speech data collected from a large number of speakers expected during the speaker verification.

23. The speaker verification system according to claim 22, wherein the template generation unit computes likelihood scores of each of the Gaussian components with the feature parameters of each frame, and selects N Gaussian components with the highest likelihood scores for each frame, N being a natural number.

24. The speaker verification system according to claim 23, wherein the front end or the template generation unit cuts the enrollment speech into multiple segments with equal or unequal sizes, each segment includes plural frames.

25. The speaker verification system according to claim 24, wherein the template generation unit sorts the Gaussian components of all frames within each segment, and merges the sorted Gaussian components to obtain a Hidden Markov Model net as the pass-phrase template.

26. The speaker verification system according to claim 25, wherein the template generation unit sorts the Gaussian components of all frames within each segment with a different component index, accumulates posterior probabilities of the sorted Gaussian components, and merges the closest Gaussian components in a distance measurement of the posterior probabilities.

27. The speaker verification system according to claim 19, wherein the adaptation methods of the adapted pass-phrase template include adaptation methods such as MAP and MLLR.

28. The speaker verification system according to claim 19, wherein the adaptation methods of the adapted general speaker model include adaptation methods such as MAP and MLLR, and the template generation unit generates the pass-phrase template with the adapted general speaker model.

* * * * *